US012808848B2

United States Patent

(12) United States Patent
Yoon et al.

(10) Patent No.: US 12,808,848 B2
(45) Date of Patent: Nov. 24, 2026

(54) THIRD-PARTY INTERFERENCE MONITORING SYSTEM AND METHOD

(71) Applicant: KOREA RESEARCH INSTITUTE OF STANDARDS AND SCIENCE, Daejeon (KR)

(72) Inventors: Dong Jin Yoon, Daejeon (KR); Choon Su Park, Daejeon (KR); Sun Ho Lee, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 274 days.

(21) Appl. No.: 18/704,855

(22) PCT Filed: Oct. 28, 2022

(86) PCT No.: PCT/KR2022/016713

§ 371 (c)(1),
(2) Date: Apr. 25, 2024

(87) PCT Pub. No.: WO2023/075509

PCT Pub. Date: May 4, 2023

(65) Prior Publication Data

US 2025/0027908 A1 Jan. 23, 2025

(30) Foreign Application Priority Data

Oct. 28, 2021 (KR) ........................ 10-2021-0145623

(51) Int. Cl.
*G01N 29/12* (2006.01)
*G01N 29/07* (2006.01)

(52) U.S. Cl.
CPC ............. *G01N 29/12* (2013.01); *G01N 29/07* (2013.01); *G01N 2291/011* (2013.01)

(58) Field of Classification Search
CPC ... G01N 29/12; G01N 29/07; G01N 2291/011
See application file for complete search history.

(56) References Cited

U.S. PATENT DOCUMENTS 3,860,481 A * 1/1975 Gopal ....................... G01H 1/00 976/DIG. 207
4,519,245 A * 5/1985 Evans .................. G01N 29/045 73/579

(Continued)

FOREIGN PATENT DOCUMENTS

CN 110765680 A * 2/2020
JP 2000121740 A * 4/2000

(Continued)

OTHER PUBLICATIONS

International Search Report and Written Opinion for International PCT Application No. PCT/KR2022/016713 dated Feb. 9, 2023 in 13 pages [ISR translated to English].

(Continued)

*Primary Examiner* — Chico A Foxx
(74) *Attorney, Agent, or Firm* — Knobbe, Martens, Olson & Bear, LLP

(57) ABSTRACT

A third-party interference monitoring system is provided. The third-party interference monitoring system, according to one embodiment of the present invention, is for detecting third-party interference in advance before a buried pipeline buried underground is damaged by the third-party interference. The third-party interference monitoring system comprises: a sensor unit which is installed on a buried pipeline so as to detect an impact signal which is propagated along the ground or the buried pipeline when heavy equipment strikes the ground; and a control unit which acquires a time domain value of the impact signal by receiving data from the sensor unit, converts the time domain value to a frequency domain value, and then detects the third-party interference on the basis of frequency response characteristics of the impact signal.

10 Claims, 13 Drawing Sheets

(56) References Cited

U.S. PATENT DOCUMENTS

| | | | | |
|---|---|---|---|---|
| 6,386,037 | B1 * | 5/2002 | Kepler | G01N 29/4436<br>73/594 |
| 10,145,983 | B2 * | 12/2018 | Nagrodsky | B61L 1/06 |

FOREIGN PATENT DOCUMENTS

| | | | | | |
|---|---|---|---|---|---|
| JP | 2003004519 | A | * | 1/2003 | |
| KR | 10-2006-0012556 | A | | 2/2006 | |
| KR | 20060012556 | A | * | 2/2006 | G01N 29/12 |
| KR | 10-2011-0037658 | A | | 4/2011 | |
| KR | 10-2011-0039067 | A | | 4/2011 | |
| KR | 20110037658 | A | * | 4/2011 | G01V 1/30 |
| KR | 101106888 | B1 | * | 1/2012 | G01N 29/36 |
| KR | 10-2238436 | B1 | | 4/2021 | |

OTHER PUBLICATIONS

Guo, et al. "A Detection and Alarm Algorithm against the Third-Party Excavation," International Conference on Intelligent Computing, Automation and Systems, IEEE, Dec. 6, 2019, pp. 613-616.

Office Action in EP Patent Application No. 22887704.9 dated Sep. 30, 2025.

* cited by examiner (a)0 SECONDS TO 1 SECOND (b)0.5 SECONDS TO 1.5 SECONDS (c)1.0 SECONDS TO 2 SECONDS (a)

(b)

THIRD-PARTY INTERFERENCE MONITORING SYSTEM AND METHOD

TECHNICAL FIELD

The present invention relates to a third-party interference monitoring system and method, and more specifically, to a monitoring system and method for detecting in advance third-party interference that is likely to damage a buried pipeline.

BACKGROUND TECHNOLOGY

Water supply pipes are social infrastructures that supply large quantities of water resources. Most of these water supply pipes are being operated while buried in the ground.

Such buried pipelines may be unexpectedly damaged due to excavation work of heavy equipment by a third-party interference during construction in an adjacent area. Accordingly, the damaged buried pipelines are either left in a state where the contents can leak, or require somewhat cumbersome replacement work, causing social costs.

In order to solve the above problem, technology for early detection of damage to buried pipelines has been studied. However, in the case of buried pipeline detection technology, most technologies are for detecting buried pipes that have already been damaged by external impacts etc. When such buried pipeline detection technology is used, damage to buried pipes cannot be prevented in advance and only rapid follow-up measures can be taken. Therefore, there is a limit in that it is difficult to reduce replacement and repair costs related to damaged buried pipelines.

Considering the above limit, there is an urgent necessity to develop detection technology that allows a user to respond before an accident occurs by detecting in advance third-party interference before buried pipes are damaged by heavy equipment.

SUMMARY OF THE INVENTION

Technical Tasks

The present invention is directed to providing a monitoring system and method that can detect third-party interference in progress in an area adjacent to a buried pipeline before the buried pipeline is damaged by the third-party interference.

The present invention is also directed to providing a monitoring system and method that can estimate and provide characteristics of third-party interference, such as whether detected third-party interference is in progress within a risk range of a buried pipeline, whether downward excavation is in progress, or the like.

Technical Solutions

According to an aspect of the present invention, there is provided a third-party interference monitoring system to detect third-party interference in advance before a buried pipeline is damaged by the third-party interference, which includes a sensor unit installed on the buried pipeline so as to detect impact signals which are propagated along the ground or the buried pipeline when heavy equipment strikes the ground, and a control unit configured to receive data from the sensor unit, acquire time domain values of the impact signals, convert the time domain values into frequency domain values, and then detect the third-party interference on the basis of frequency response characteristics of the impact signals.

In this case, the third-party interference monitoring system may further include a storage unit in which reference data for detecting the third-party interference is stored, wherein the control unit analyzes the frequency response characteristics in consideration of the reference data.

In this case, the reference data may include a frequency band of interest and a reference magnitude range, and the control unit may compare a magnitude range of a band corresponding to the frequency band of interest among the frequency domain values with the reference magnitude range and detect the third-party interference.

In this case, the frequency band of interest and the reference magnitude range may be acquired by performing an experiment in advance on the buried pipeline or a pipeline having the same material and specification as the buried pipeline.

In this case, the control unit may determine whether the detected third-party interference is a dangerous third-party interference that is likely to damage the buried pipeline on the basis of the frequency response characteristics.

In this case, the control unit may determine whether the detected third-party interference is a downward excavating in progress of downward excavation on the basis of the frequency response characteristics.

In this case, when a plurality of impact signals are checked within a predetermined period of time and levels of frequency response characteristics of the plurality of impact signals are gradually increased, the control unit may determine that the third-party interference is a downward excavating third-party interference.

In this case, the sensor unit may include a first sensor and a second sensor that are disposed to be spaced a predetermined interval from each other along an longitudinal direction of the buried pipeline, and the control unit may receive data from each of the first sensor and the second sensor, acquire a first time domain value and a second time domain value, and then convert the first time domain value and the second time domain value into a first frequency domain value and a second frequency domain value, respectively.

In this case, the control unit may analyze frequency response characteristics of an impact signal detected by the first sensor and frequency response characteristics of an impact signal detected by the second sensor, and when the presence of the third-party interference is confirmed in both of the cases, the control unit may determine that the third-party interference is detected.

In this case, the control unit may divide each of the first time domain value and the second time domain value into a plurality of time sections so that an overlapping portion is present between two adjacent time sections, and then convert each of the first time domain value and the second time domain value into a frequency domain value.

In this case, the control unit may estimate a location of the third-party interference using the following equations:

[Equations]

$$D_1 = \frac{1}{2}(L + C\tau)$$

$$D_2 = \frac{1}{2}(L - C\tau)$$

(in the Equations, $D_1$ denotes a distance between the location of the third-party interference and the first sensor, $D_2$ denotes a distance between the location of the third-party interference and the second sensor, L denotes a total length of the buried pipeline between sensors, C denotes a propagation speed of the impact signal propagated through the buried pipeline, and τ denotes a difference in arrival time between the impact signal on the first time domain value and the impact signal on the second time domain value).

In this case, when a plurality of impact signals are checked and a plurality of locations of the third-party interference that are estimated by analyzing each of the plurality of impact signals are all within a predetermined error range, the control unit may determine that the third-party interference is the downward excavating third-party interference.

In this case, the control unit may detect the third-party interference on the basis of morphological characteristics of a waveform in the time domain in addition to the frequency response characteristics.

According to another aspect of the present invention, there is provided a third-party interference monitoring method to detect third-party interference in advance before a buried pipeline is damaged by the third-party interference, which includes detecting, by a sensor unit installed on the buried pipeline, an impact signal which is propagated along the ground or the buried pipeline due to heavy equipment striking the ground; receiving, by a control unit, data from the sensor unit, acquiring a time domain value related to the impact signal, and then converting the time domain value into a frequency domain value; and analyzing, by the control unit, frequency response characteristics of the impact signal and detecting the third-party interference.

In this case, the analyzing of, by the control unit, the frequency response characteristics of the impact signal and detecting the third-party interference may include estimating a location of the third-party interference; determining whether the third-party interference is a dangerous third-party interference that is likely to damage the buried pipeline; and analyzing the location of the third-party interference and determining whether the third-party interference is a downward excavating third-party interference in progress of downward excavation.

Advantageous Effects

According to the present invention, before a buried pipeline is damaged by an unexpected third-party interference, a control unit can analyze frequency response characteristics according to a pipeline propagated vibration and detect the third-party interference in advance, and thus the control unit can provide a manager of the buried pipeline with the opportunity to take preemptive action and protect the buried pipeline more effectively from the third-party interference.

Further, in the present invention, in addition to detecting third-party interference, the control unit can determine whether third-party interference detected based on the above-described frequency response characteristics is a dangerous third-party interference, and thus the control unit can provide the manager of the buried pipeline with more accurate information on the third-party interference.

Further, in the present invention, the control unit can analyze an impact signal in a more three-dimensional manner and determine whether the detected third-party interference is the downward excavating third-party interference that is in progress of downward excavation.

Further, in the present invention, the above-described control unit can divide an impact signal into unit time intervals so that an overlapping portion is present, and thus the control unit can minimize the impact signal omission, and accordingly, monitor the third-party interference more accurately.

DETAILED DESCRIPTION OF EMBODIMENTS

Figure 1:
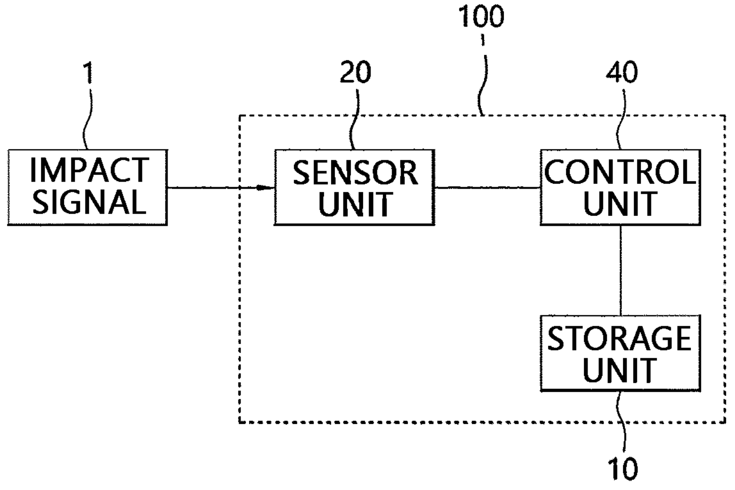
FIG. 1 is a configuration diagram of a third-party interference monitoring system according to an embodiment of the present invention.

Hereinafter, embodiments that are easily performed by those skilled in the art will be described in detail with reference to the accompanying drawings. Embodiments of the present invention may be implemented in several different forms, and are not limited to embodiments described herein. In the drawings, parts not related to the description may be omitted to clearly describe the present invention, and the same reference numerals may be used for the same or similar elements throughout the specification. Further, thicknesses of lines, sizes of components, and the like illustrated in the drawings may be exaggerated for clarity and convenience of description.

Figure 2:
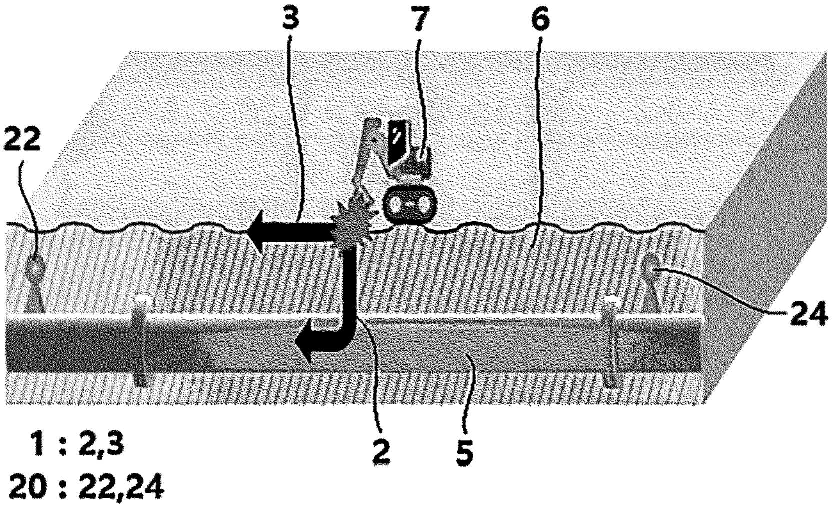
FIG. 2 is an explanatory diagram for describing propagation of an impact signal along the ground or a buried pipeline due to third-party interference.

FIG. 1 is a configuration diagram of a third-party interference monitoring system according to an embodiment of the present invention, and FIG. 2 is an explanatory diagram for describing propagation of an impact signal along the ground or a buried pipeline due to third-party interference. Further, FIG. 3 includes (a) a graph showing a time domain value of an impact signal measured by a first sensor (b) a graph showing a time domain value of an impact signal measured by a second sensor, and FIG. 4 is a graph showing frequency domain values when pipeline propagated vibration is included and when it is not.

A third-party interference monitoring system 100 according to the embodiment of the present invention is a system for preventing a buried pipeline 5 from being damaged by being struck by heavy equipment or the like during unexpected third-party interference.

To this end, as shown in FIG. 1, the third-party interference monitoring system 100 according to the embodiment of the present invention may include a storage unit 10, a sensor unit 20, and a control unit 40. In this case, depending on a method of implementing the third-party interference monitoring system 100 according to the embodiment of the present invention, components of the third-party interference monitoring system 100 may be combined with each other and implemented as one, or some components may be omitted.

Referring to the components, first, reference data that is used by the control unit 40, which will be described below, to detect third-party interference may be stored in the storage unit 10.

Figure 10:
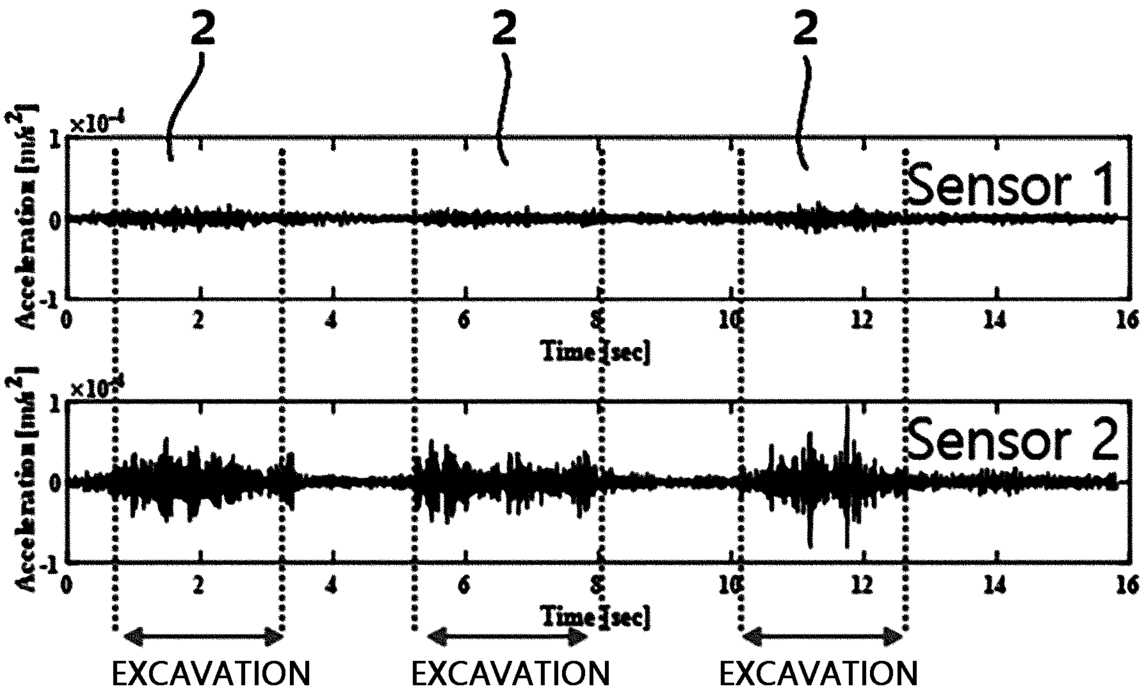
FIG. 10 includes (a) a graph showing time domain values of impact signals measured by a first sensor and a second sensor during a downward excavating third-party interference and (b) a graph showing a location of third-party interference that is estimated by analyzing the impact signals, over time.
Figure 10:
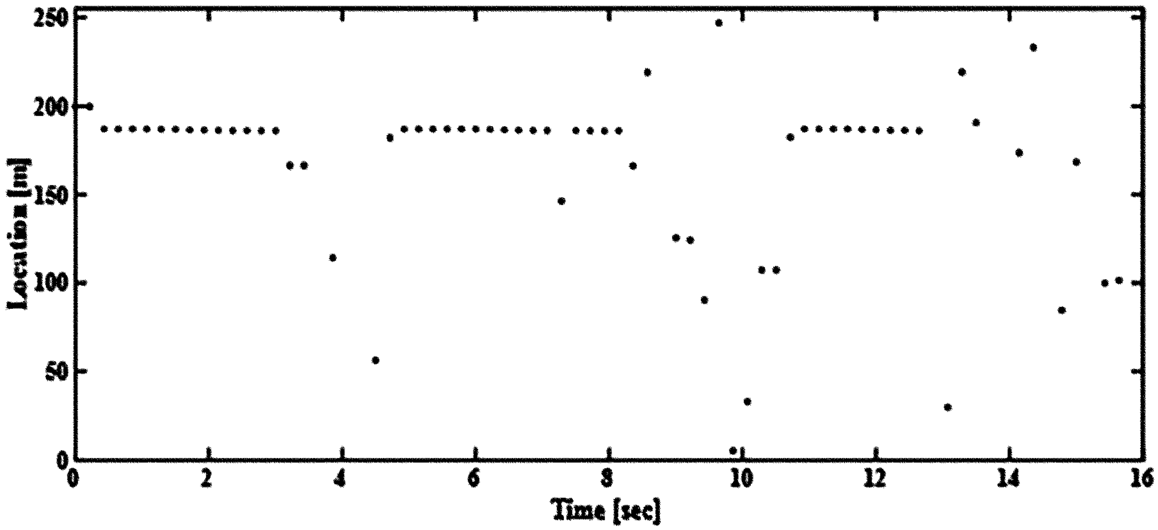

In this case, the reference data stored in the storage unit 10 may be, for example, a frequency band of interest and a reference magnitude range of an impact signal generated by the third-party interference. As another example, the reference data may be a value acquired by parameterizing morphological characteristics of a waveform in a time domain as similar waveforms in a time domain are repeated a predetermined number of times at equal intervals for the same location, as shown in FIG. 10. However, it should be noted that examples of the reference data are not limited to the above-described examples, and that various pieces of data for detecting third-party interference may be stored.

In this case, in the storage unit 10, reference data of different values may be stored for each of third-party interference (hereinafter, referred to as a "dangerous third-party interference") that is carried out in a location adjacent to the buried pipeline and is likely to damage the buried pipeline, and third-party interference (hereinafter, referred to as a "safe third-party interference") that is carried out in a location separated a predetermined distance from the buried pipeline and is unlikely to damage the buried pipeline.

In this case, the reference data may be acquired by performing an experiment in advance on the buried pipeline 5, which is a subject of actual observation, or a pipeline having the same material and specification as the buried pipeline 5. In this case, the experiment may be performed in the ground 6 where the buried pipeline 5 is actually buried, or in an environment simulating it. Accordingly, the accuracy of detection of the third-party interference by the control unit 40 can be improved by reflecting the impact of ground environment in the reference data as much as possible.

Further, in the storage unit 10, various types of logic, algorithms, and programs that are required in a process in which the control unit 40, which will be described below, acquires a time domain value of an impact signal detected by the sensor unit 20, converts the time domain value into a frequency domain value, and then determines whether third-party interference is detected based on frequency response characteristics of the corresponding impact signal may be stored.

Meanwhile, the storage unit 10 may include at least one type of storage medium of a memory of a flash memory type, a hard disk type, a micro type, a card type (e.g., secure digital (SD) card type, an extreme digital (xD) card) type, or the like, a random access memory (RAM), a static RAM (SRAM), a read-only memory (ROM), a programmable ROM (PROM), an electrically erasable PROM (EEPROM), a magnetic RAM (MRAM), and a memory of a magnetic disk type or an optical disk type.

Next, for example, the sensor unit 20 may be implemented as a vibration accelerometer, a hydrophone, a microphone, or the like, and may be installed at one location of the buried pipeline 5 to detect an impact signal related to third-party interference around the buried pipeline.

In this case, referring to FIG. 2, an impact signal 1 detected by the sensor unit 20 may be an elastic wave that is propagated when heavy equipment 7 such as an excavator (backhoe) or the like strikes the ground during the third-party interference, and specifically, may be a ground propagated vibration 3 or a pipeline propagated vibration 2. Here, as shown in the drawing, the ground propagated vibration 3 may be an elastic wave that is propagated toward the sensor unit 20 along the ground 6 without passing through the buried pipeline 5 and the pipeline propagated vibration 2 may be an elastic wave that is propagated along the buried pipeline 5 passing through the ground 6.

Figure 3:
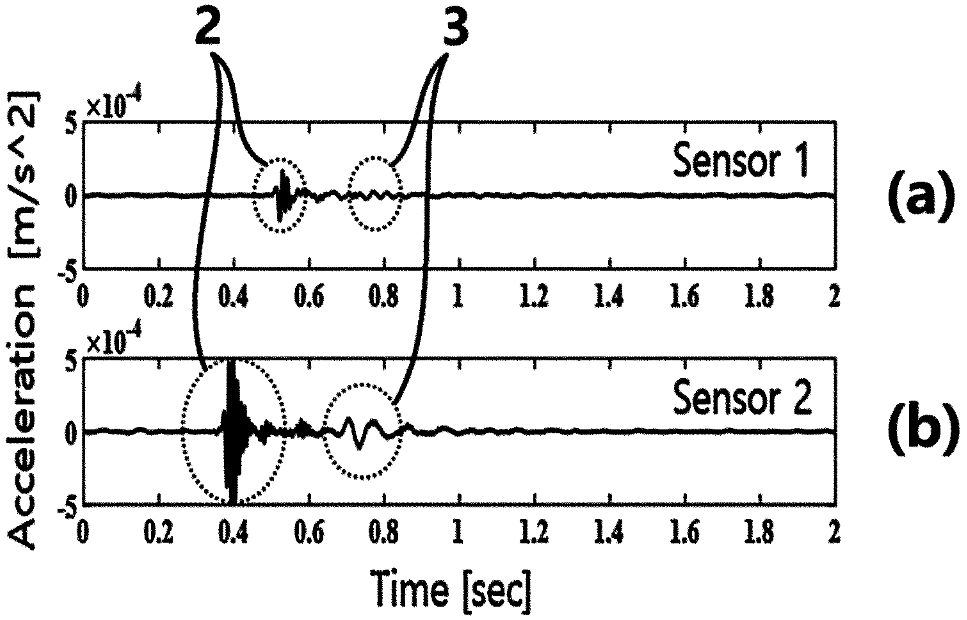
FIG. 3 includes (a) a graph showing a time domain value of an impact signal measured by a first sensor and (b) a graph showing a time domain value of an impact signal measured by a second sensor.
Figure 4:
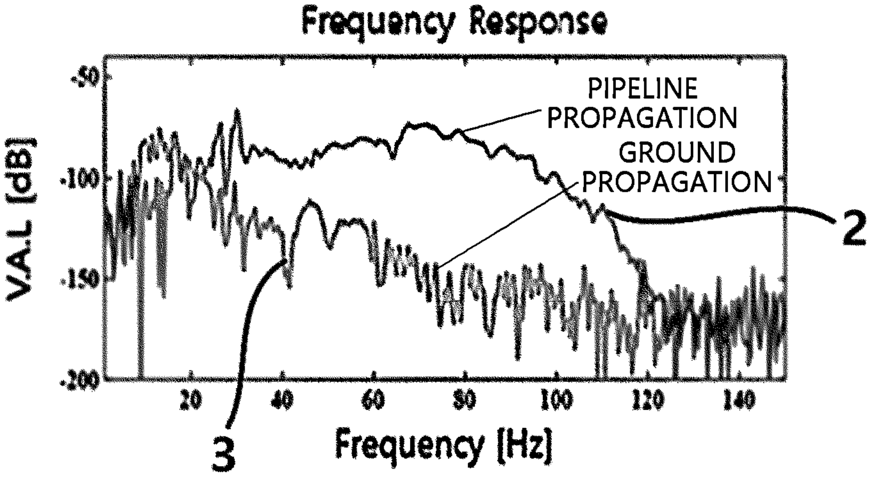
FIG. 4 is a graph showing frequency domain values when a pipeline propagated vibration is included and when it is not.

In this regard, the inventors of the present invention found that when third-party interference is in progress in an area adjacent to the buried pipeline 5, not only the ground propagated vibration 3 but also the pipeline propagated vibration 2 is detected by the sensor unit 20 of the buried pipeline 5 as shown in FIGS. 2 and 3. That is, it was found that when there is the third-party interference in the area adjacent to the buried pipeline 5, impact energy generated due to the third-party interference is transmitted to the buried pipeline 5 through the ground and is detected by the sensor unit 20. In particular, the inventors of the present invention was able to confirm that, as shown in the drawing, the pipeline propagated vibration 2 reaches the sensor unit 20 faster than the ground propagated vibration 3 due to a difference in media, and that, when the frequency response characteristics are analyzed as shown in FIG. 4, the pipeline propagated vibration 2 occurs at a higher frequency than the ground propagated vibration 3. Accordingly, the inventors of the present invention found that, when a change in frequency response characteristics caused by the pipeline propagated vibration 2 is carefully observed, the presence of the third-party interference can be confirmed before the buried pipeline 5 is damaged.

In an embodiment of the present invention, the sensor unit 20 may include a plurality of sensors, including a first sensor 22 and a second sensor 24, which are disposed to be spaced a predetermined interval from each other along a longitudinal direction of the buried pipeline 5, as shown in the drawing. In this case, the first sensor 22 and the second sensor 24 may independently collect impact signals generated from the same strike. In an embodiment of the present invention, the reason why the sensor unit 20 includes the plurality of sensors is to estimate a location of the third-party interference and improve the accuracy of detection of the third-party interference, and this will be described below.

Meanwhile, the sensor unit 20 may transmit data related to the detected impact signal to the control unit 40. To this end, the sensor unit 20 may be connected to the control unit 40 in a wired manner or may include a wireless Internet module, a short-range communication module, or the like to transmit a wireless signal to the control unit 40.

Figure 5:
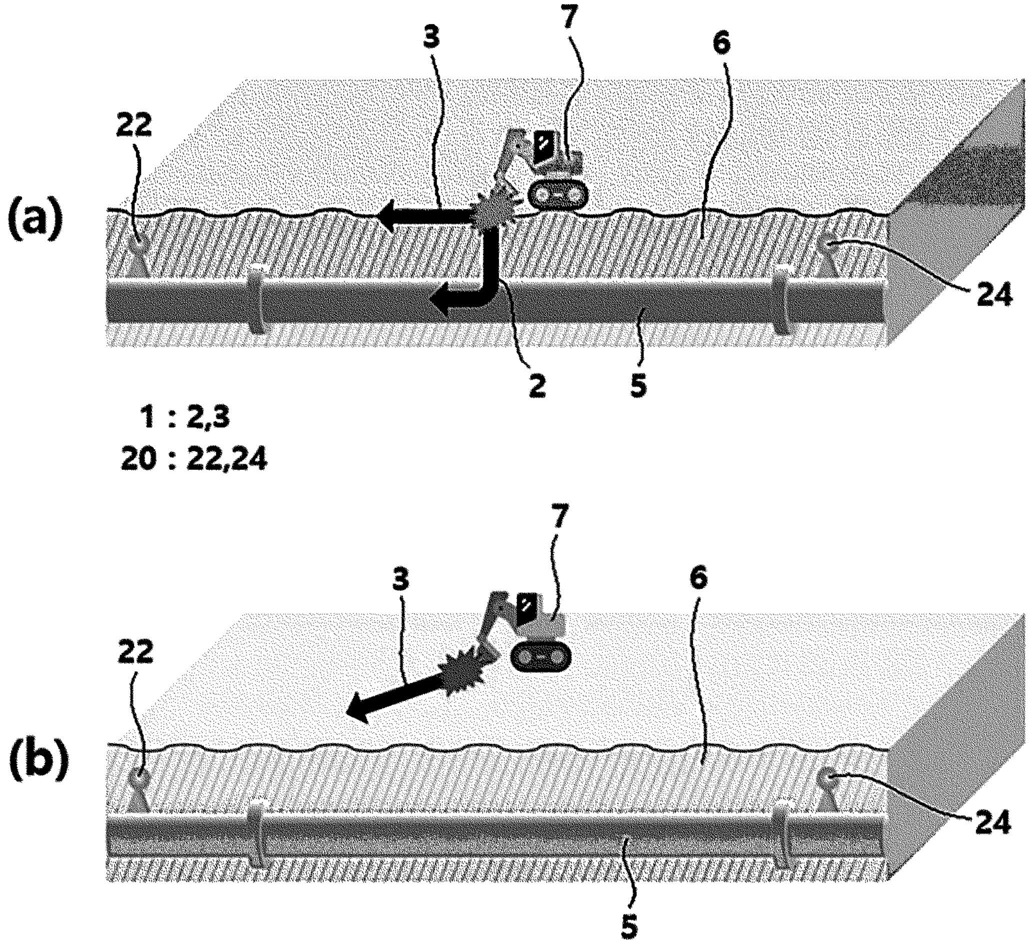
FIG. 5 is an explanatory diagram for comparing a dangerous third-party interference that is likely to damage a buried pipeline with a safe third-party interference that is not.
Figure 6:
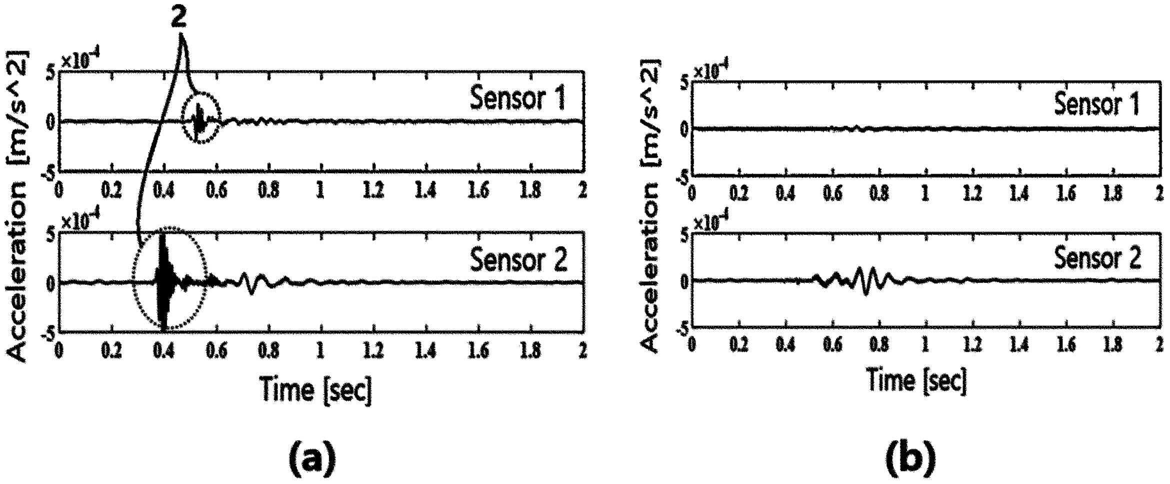
FIG. 6 includes (a) a graph showing a time domain value of an impact signal during the dangerous third-party interference of FIG. 5 and (b) a graph showing a time domain value of an impact signal during the safe third-party interference of FIG. 5.
Figure 7:
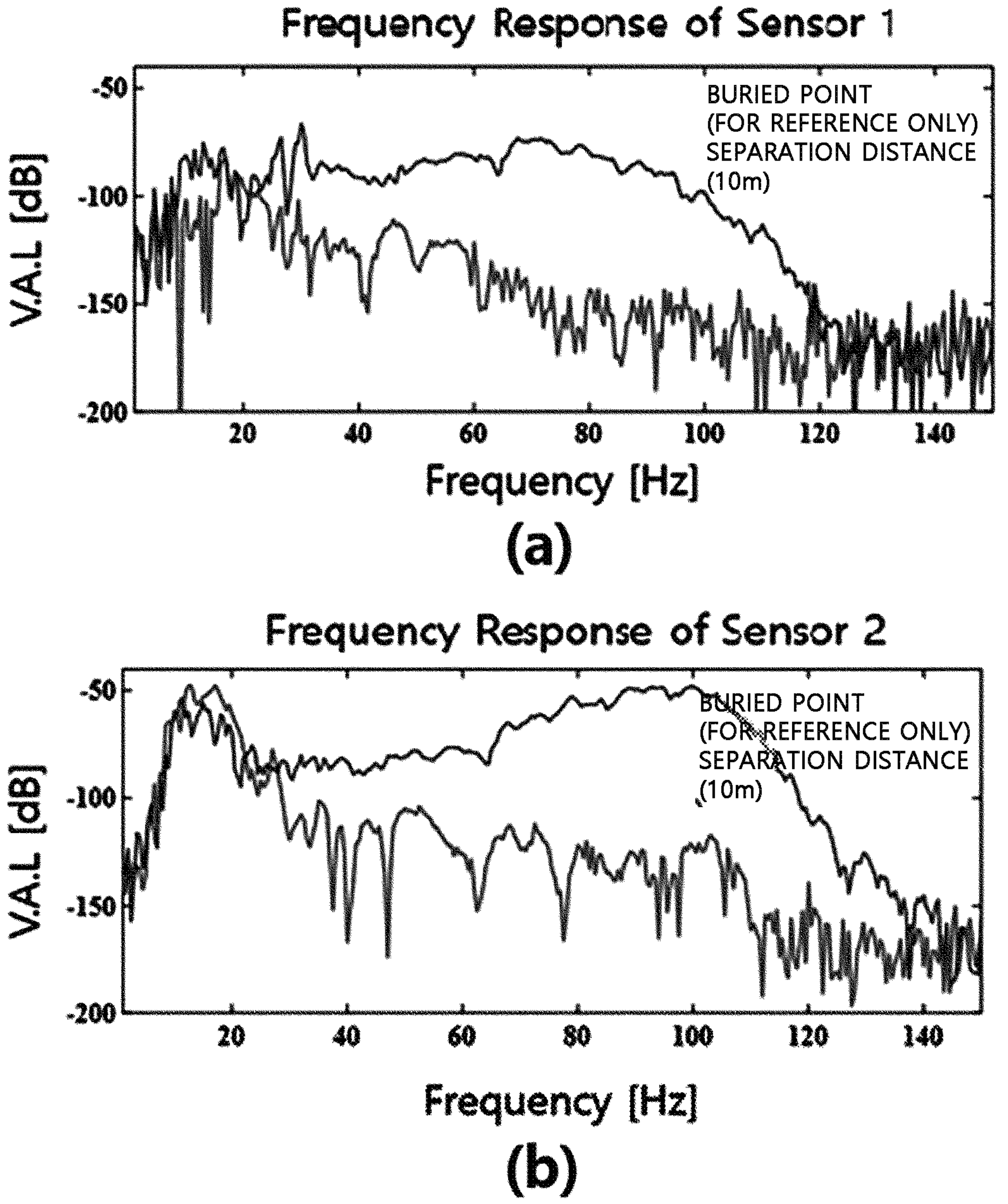
FIG. 7 includes (a) a graph showing a frequency domain value of an impact signal measured by a first sensor for comparing a dangerous third-party interference with a safe third-party interference and (b) a graph showing a frequency domain value of an impact signal measured by a second sensor for comparing a dangerous third-party interference with a safe third-party interference.
Figure 8:
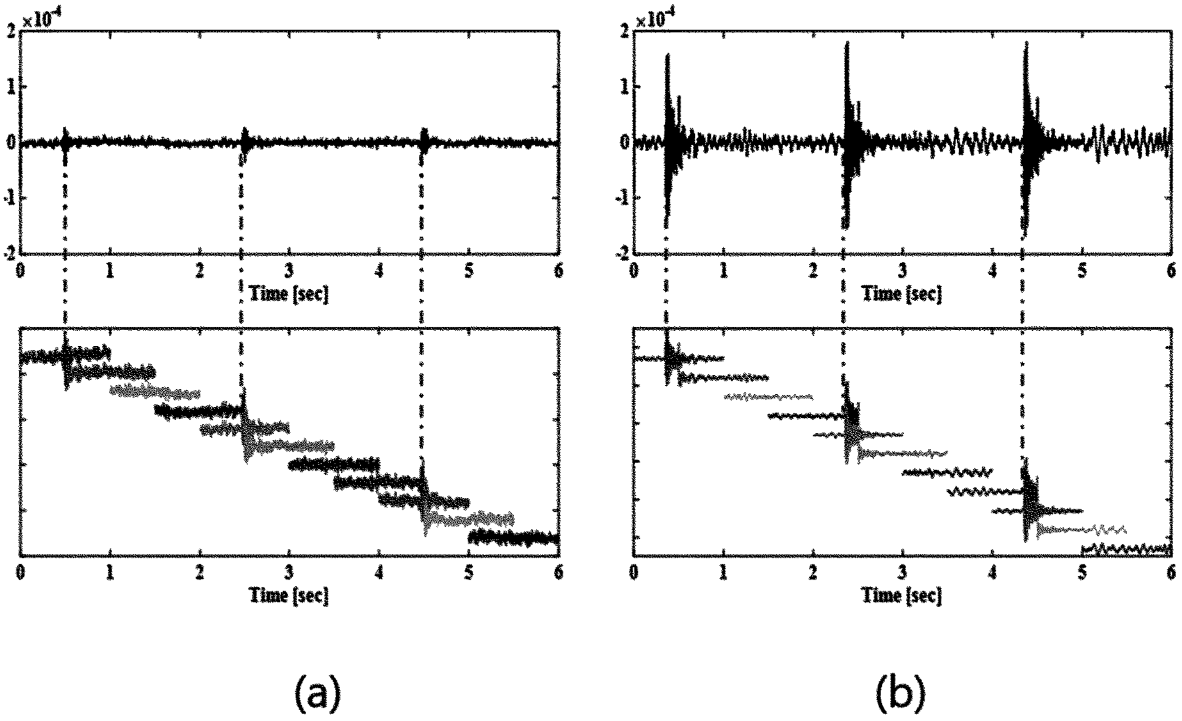
FIGS. 8 and 9 are explanatory diagrams for describing a process in which a control unit of a third-party interference monitoring system according to an embodiment of the present invention divides impact signals.
Figure 9:
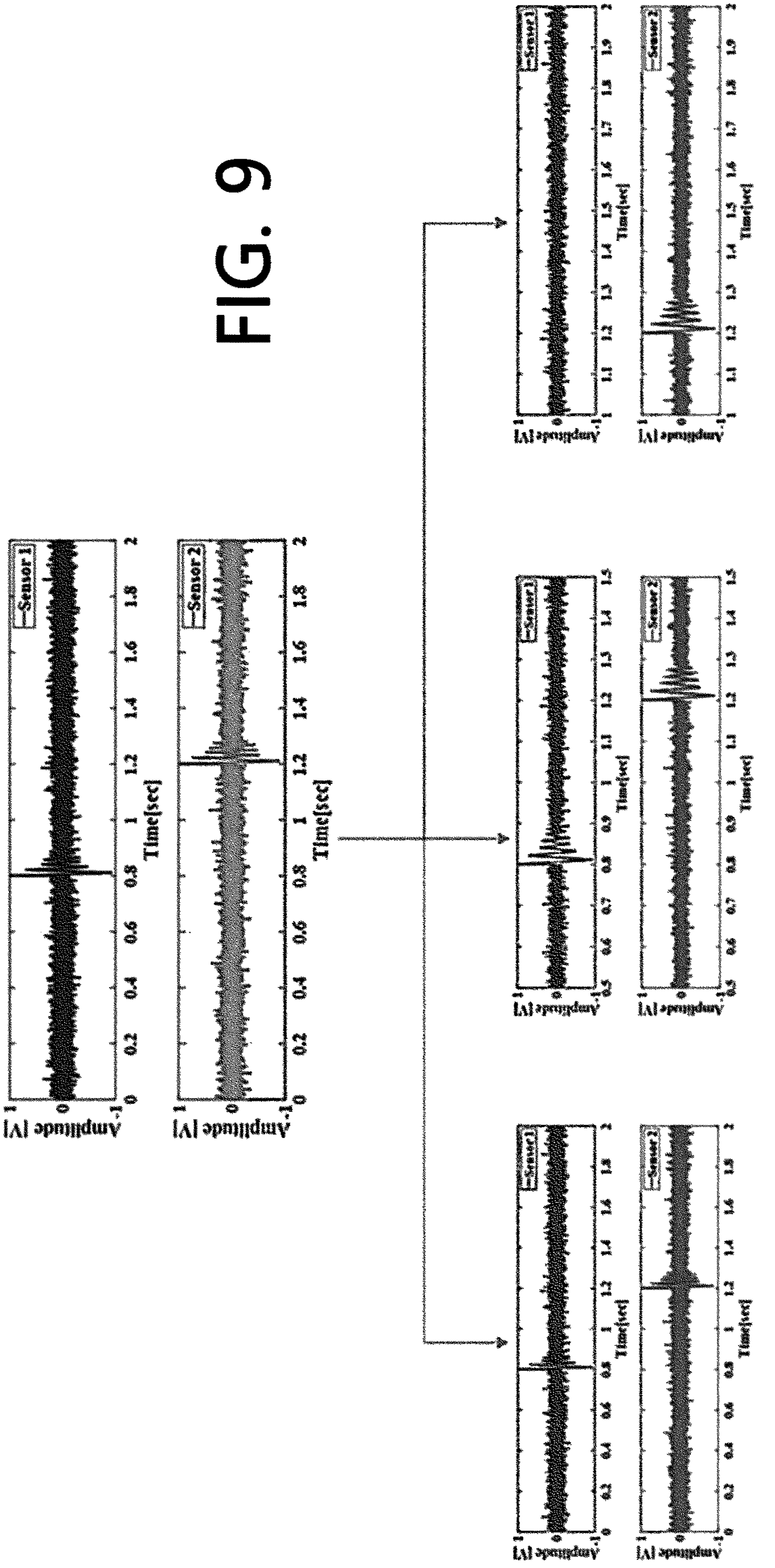

FIG. 5 is an explanatory diagram for comparing a dangerous third-party interference that is likely to damage a buried pipeline with a safe third-party interference that is not, (a) of FIG. 6 is a graph showing a time domain value of an impact signal during the dangerous third-party interference of FIG. 5, and (b) of FIG. 6 is a graph showing a time domain value of an impact signal during the safe third-party interference of FIG. 5. Further, (a) of FIG. 7 shows a frequency domain value of an impact signal measured by a first sensor and is a graph for comparing a dangerous third-party interference with a safe third-party interference, and (b) of FIG. 7 shows a frequency domain value of an impact signal measured by a second sensor and is a graph for comparing a dangerous third-party interference with a safe third-party interference. Then, FIGS. 8 and 9 are explanatory diagrams for describing a process in which a control unit of a third-party interference monitoring system according to an embodiment of the present invention divides impact signals, (a) of FIG. 10 is a graph showing time domain values of impact signals measured by a first sensor and a second sensor during a downward excavating third-party interference, and FIG. (b) 10 is a graph showing a location of third-party interference that is estimated by analyzing the impact signals, over time.

Next, the control unit 40 may detect the third-party interference in progress in the area adjacent to the buried pipeline by processing and analyzing information related to the above-described impact signal transmitted from the sensor unit 20. The control unit 40 may be implemented in the form of hardware or software or may be implemented in the form of a combination of hardware and software. Preferably, the control unit 40 may be implemented with a microprocessor, but the present invention is not limited thereto.

In order to detect the third-party interference, the control unit 40 may first receive data from the sensor unit 20 and acquire a time domain value of the impact signal. In this case, when the sensor unit 20 includes a plurality of sensors, the control unit 40 may receive data from each of the first sensor 22 and the second sensor 24, as shown in FIG. 3, and acquire a first time domain value and a second time domain value.

Thereafter, the control unit 40 may perform, for example, a fast Fourier transform (FFT) to convert each of the first time domain value and the second time domain value into a frequency domain value, as shown in FIG. 4.

Then, the control unit 40 may detect the third-party interference on the basis of frequency response characteristics of the impact signal. In this case, the control unit 40 may analyze the frequency response characteristics in consideration of the reference data pre-stored in the storage unit 10, as described above.

As an illustrative example related to the above, the control unit 40 may analyze the frequency response characteristics only for a band corresponding to a frequency band of interest among the frequency domain values.

More specifically, when comparing a case in which third-party interference is in progress adjacent to a buried pipeline such that an impact signal includes both a pipeline propagated vibration 2 and a ground propagated vibration 3 (see (a) of FIG. 5) with a case in which third-party interference is in progress at a location far away from a buried pipeline or there is no third-party interference such that an impact signal mainly includes a ground propagated vibration 3 (see (b) of FIG. 5), it can be seen that frequency responses in a frequency band of approximately 20 Hz or less or 120 Hz or more show almost similar characteristics, as shown in FIG. 7. However, in the case of a 20 Hz to 120 Hz band (frequency band of interest), it can be seen that a level difference between two frequency responses is significantly large. Therefore, the control unit 40 may detect the third-party interference more accurately and rapidly by analyzing the frequency response characteristics of only a specific frequency band of interest.

Further, the control unit 40 may detect the third-party interference by comparing a magnitude range of the frequency band of interest with a magnitude range stored in the storage unit 10.

For example, the control unit 40 may check a maximum value of the frequency domain value within the frequency band of interest, and then, when the maximum value is greater than or equal to a threshold value set in the reference data, the control unit 40 may determine that the third-party interference is in progress adjacent to the buried pipeline 5. Further, as another example, the control unit 40 may check a difference between a minimum value and a maximum value of the frequency domain value within the frequency band of interest, and when the difference is greater than or equal to a threshold value set in the reference data, the control unit 40 may determine that the third-party interference is in progress.

However, it is only an example that the control unit 40 analyzes the frequency response characteristics using the reference data stored in the storage unit 10, and in addition, the control unit 40 may detect the third-party interference without reference data on the basis of an algorithm stored in the storage unit 10, such as an artificial neural network trained in advance to detect third-party interference. In this case, the artificial neural network may train in advance the frequency response characteristics of the impact signal acquired when the third-party interference is included, and then determine whether the impact signal includes a signal related to the third-party interference on the basis of the frequency response characteristics.

Meanwhile, the control unit 40 may additionally determine whether the third-party interference detected as described above is the third-party interference that is likely to damage the buried pipeline 5.

Specifically, as shown in (a) of FIG. 5, when excavation work by heavy equipment continues, the third-party interference in progress at a portion located directly on the buried pipeline 5 or at a location adjacent to the portion located directly on the buried pipeline 5 may strike and damage the buried pipeline 5. On the other hand, as shown in (b) of FIG. 5, there is no concern that the third-party interference in progress at a location spaced a predetermined distance from a portion located directly on the buried pipeline 5 in a direction intersecting a longitudinal direction of the buried pipeline 5 affects the buried pipeline even when excavation work continues. Hereinafter, in this specification, the third-party interference that is likely to strike the buried pipeline is defined as a "dangerous third-party interference," and the third-party interference that is unlikely to strike the buried pipeline is defined as a "safe third-party interference."

In this regard, the control unit 40 may determine whether the detected third-party interference is the dangerous third-party interference or the safe third-party interference. In this case, the control unit 40 may similarly classify the dangerous third-party interference and the safe third-party interference on the basis of the frequency response characteristics of the impact signal.

More specifically, even when it is the same third-party interference, in the case of the dangerous third-party interference (see (a) of FIG. 5), the pipeline propagated vibration 2 is observed before the ground propagated vibration 3 arrives, as shown in (a) of FIG. 6. However, in the case of the safe third-party interference (see (b) of FIG. 6), since a source of strike, such as heavy equipment or the like, is located at a location somewhat separated from the buried pipeline 5, unlike in the dangerous third-party interference, the pipeline propagated vibration 2 propagated along the buried pipeline 5 may be minimal or not observed (see (b) of FIG. 6). As a result, as shown in FIG. 7, the frequency response characteristics of the dangerous third-party interference and the safe third-party interference may be different, and the control unit 40 may distinguish the dangerous third-party interference and the safe third-party interference on the basis of the different frequency response characteristics.

In this case, the control unit 40 may retrieve reference data related to the dangerous third-party interference and the safe third-party interference from the storage unit 10 and analyze the frequency response characteristics of the impact signal, similar to when detecting the third-party interference.

In this case, the determination of the third-party interference located at a certain distance from the buried pipeline 5 as the safe third-party interference may be differently defined depending on the user's requirements. To this end, the control unit 40 may use a reference data value corresponding to the user's requirements from among various pieces of reference data stored in the storage unit 10.

For example, when the user intends to detect only the third-party interference located within a 10 m radius from a portion located directly on the buried pipeline as the dangerous third-party interference, the control unit 40 may retrieve the reference data corresponding to a 10 m radius from the storage unit and use the reference data to analyze the frequency response characteristics. Here, the reference data of various sizes stored according to the user's requirements may be acquired through an experiment performed in advance on the corresponding buried pipeline. In this way, the third-party interference monitoring system 100 according to the embodiment of the present invention may select and notify only the dangerous third-party interference, thereby providing the user with more reliable information about the third-party interference.

In an embodiment of the present invention, when the sensor unit 20 includes a plurality of sensors 22 and 24, the control unit 40 may analyze a first frequency response characteristic related to an impact signal detected by the first sensor 22 and a second frequency response characteristic related to an impact signal detected by the second sensor 24. Then, the control unit 40 may determine that the third-party interference is in progress on the ground only when the presence of the third-party interference is confirmed as a result of analyzing the first frequency response characteristic and the second frequency response characteristic. Accordingly, the third-party interference monitoring system 100 according to the embodiment of the present invention may detect the third-party interference more accurately by minimizing misdetection.

In this regard, the control unit 40 may divide each of a first time domain value and a second time domain value into a plurality of time sections, as shown in FIGS. 8 and 9. For example, the time sections may be continuously divided into 1 second intervals as shown in the drawings. However, the interval for dividing the time section is not limited to the above-described example, and may be changed variously in consideration of a distance between the first sensor 22 and the second sensor 24 and a speed of a pipeline propagated vibration propagated along the buried pipeline.

Then, the control unit 40 may convert each of the plurality of time sections divided as described above into a frequency domain value. In this way, the third-party interference monitoring system 100 according to the embodiment of the present invention may divide the impact signals into unit time intervals and extract the impact signal to compare/analyze features per unit section for all continuous signals, thereby detecting the third-party interference more efficiently and transmitting related information to the user.

Referring to FIG. 9 again, the control unit 40 may divide the plurality of time sections so that an overlapping portion is present between two adjacent time sections among the plurality of divided time sections. For example, when the unit time interval is 1 second, a time domain value of 0 seconds to 2 seconds is not divided into 0 seconds to 1 second and 1 second to 2 seconds, instead may be divided into 0 seconds to 1 second, 0.5 seconds to 1.5 seconds, and 0.1 seconds to 2 seconds so as to overlap at 0.5 second intervals. In this way, the reason why the third-party interference monitoring system 100 according to the embodiment of the present invention divides the time domain value so that an overlapping portion is present is to prevent the impact signal from being omitted when determining the third-party interference.

Specifically, when the first sensor 22 and the second sensor 24 are asymmetrically located from the location of the third-party interference, times it takes for the impact signal to reach each sensor may be different. As an illustrative example, referring to FIG. 9, for the same shock signal, it may be indicated that the impact signal arrived around 0.8 seconds on the first time domain value, and it may be indicated that the impact signal arrived around 1.2 seconds on the second time domain value (when the third-party interference is closer to the first sensor 22 so that a delay of 0.4 seconds occurs between both sensors).

In this case, when the control unit 40 divides the time domain value continuously, such as 0 seconds to 1 second and 1 second to 2 seconds, without an overlapping portion, for the time section of 0 seconds to 1 second, it may be determined that the impact signal is detected only on the first sensor 22, and for the time section of 1 second to 2 seconds, it may be determined that the impact signal is detected only on the second sensor 24. In this case, as in the above-described example, when the control unit 40 determines that the third-party interference is present on the ground only when the third-party interference is confirmed as a result of analyzing both the first frequency response characteristic and the second frequency response characteristic, a problem occurs in which the control unit 40 determines that there is no third-party interference for the entire time section. In order to solve the problem, the control unit 40 may divide the time domain value so that an overlapping portion is present.

Meanwhile, the control unit 40 may include a plurality of sensors including the first sensor 22 and the second sensor 24 to estimate locations of the third-party interference using the following equations.

$$D_1 = \frac{1}{2}(L + C\tau) \qquad \text{[Equations]}$$

-continued $$D_2 = \frac{1}{2}(L - C\tau)$$

In this case, $D_1$ may denote a distance between the location of the third-party interference and the first sensor, $D_2$ may denote a distance between the location of the third-party interference and the second sensor, L may denote a total length of the buried pipeline, C may denote a propagation speed of the impact signal propagated through the buried pipeline, and $\tau$ may denote a difference in arrival time between the impact signal on the first time domain value and the impact signal on the second time domain value.

Here, the difference $\tau$ in arrival time between the two signals may be calculated more accurately by checking a peak value of a cross-correlation function.

Then, when a plurality of impact signals are confirmed to appear continuously at predetermined time intervals on a time domain value as shown in FIG. 10, the control unit 40 may determine in various ways whether the plurality of impact signals are caused by the third-party interference that is in progress with downward excavation That is, the types of third-party interference include third-party interference that performs downward excavation work, which involves excavating below the ground, and may include, for example, third-party interference that does not perform downward excavation but can transmit impact energy to the ground, such as a road roller, a road crusher, etc. The control unit 40 may select only a downward excavating third-party interference that is highly likely to damage the buried pipeline 5 from among various types of third-party interference.

To this end, first, the control unit 40 may analyze the plurality of impact signals to check whether the estimated locations of the third-party interference are the same. When the locations of the third-party interference derived by analyzing the plurality of impact signals are all within a predetermined error range, the control unit 40 may determine that the third-party interference is a downward excavating third-party interference that is in progress of downward excavation (see FIG. 10).

In addition, the control unit 40 may determine whether the third-party interference is a downward excavating third-party interference on the basis of the frequency response characteristics. Specifically, when the plurality of impact signals are confirmed within a predetermined period of time and at the same time, levels of a plurality of frequency response characteristics according to the plurality of impact signals are gradually increased, the control unit 40 may determine that the third-party interference is a downward excavating third-party interference.

In the case of the downward excavating third-party interference, the possibility of striking the buried pipeline 5 may be higher compared to lateral excavation. Therefore, as described above, the third-party interference monitoring system 100 according to the embodiment of the present invention may notify the user in advance of the presence of the downward excavating third-party interference, thereby encouraging the user to more carefully monitor the progress of the third-party interference.

Figure 11:
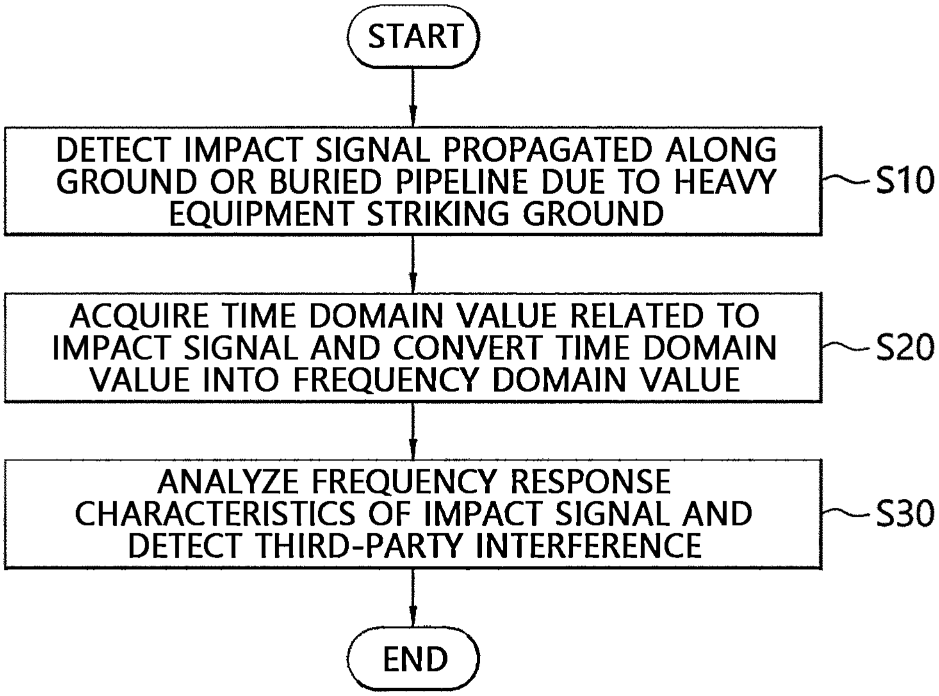
FIGS. 11 and 12 are flowcharts of a third-party interference monitoring method according to an embodiment of the present invention.
Figure 12:
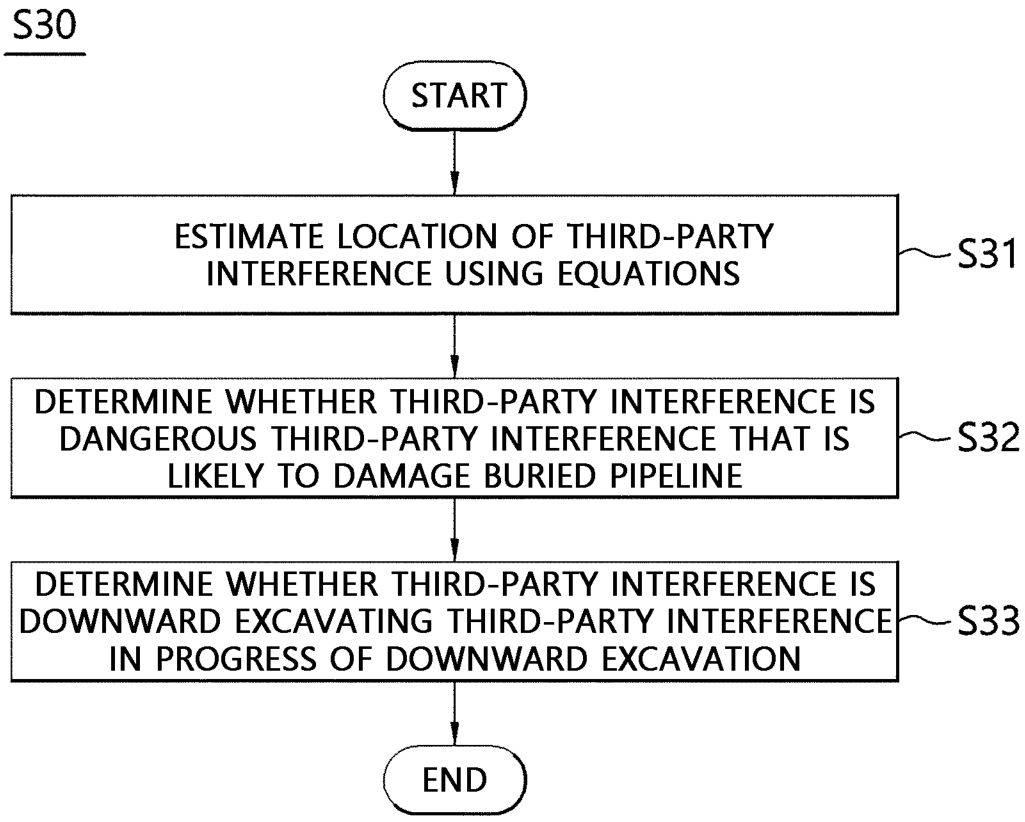

FIGS. 11 and 12 are flowcharts of a third-party interference monitoring method according to an embodiment of the present invention.

First, the sensor unit 20 installed on the buried pipeline 5 detects an impact signal propagated along the ground 6 or the buried pipeline 5 due to heavy equipment striking the ground 6 (S10).

Thereafter, the control unit 40 receives data from the sensor unit 20, acquires a time domain value related to the impact signal, and converts the time domain value into a frequency domain value (S20).

Next, the control unit 40 may analyze frequency response characteristics of the impact signal to detect third-party interference (S30). In this case, the control unit 40 may analyze the frequency response characteristics in consideration of the reference data stored in the storage unit 10 as described above.

In this case, operation S30 of detecting the third-party interference may include, for example, an operation S31 of estimating a location of the third-party interference, an operation S32 of determining whether the third-party interference is a dangerous third-party interference, and an operation S33 of determining whether the third-party interference is a downward excavating third-party interference, as shown in FIG. 12. In this case, since specific methods of performing the operations are the same as previously described, the description thereof will not be repeated.

Figure 13:
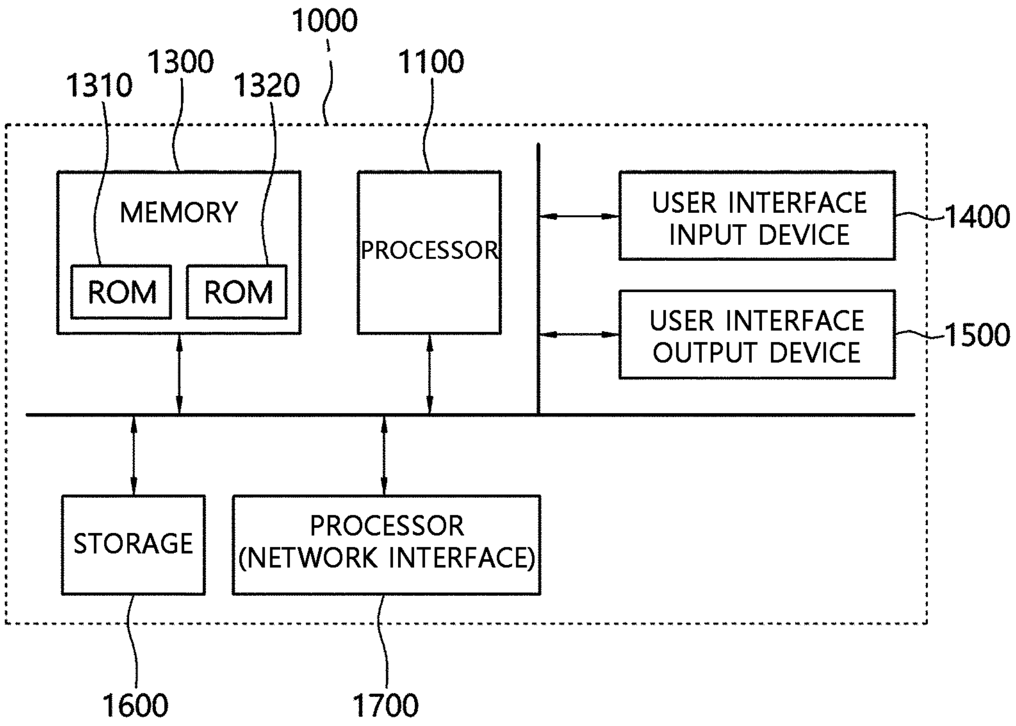
FIG. 13 is a block diagram showing a computing system for operating a third-party interference monitoring system according to an embodiment of the present invention.

FIG. 13 is a block diagram showing a computing system for operating a third-party interference monitoring system according to an embodiment of the present invention.

Referring to FIG. 13, the third-party interference monitoring method according to the embodiment of the present invention described above may be implemented through a computing system. A computing system 1000 may include at least one processor 1100, a memory 1300, a user interface input device 1400, a user interface output device 1500, a storage 1600, and a network interface 1700, which are connected through a system bus 1200.

The processor 1100 may be a central processing unit (CPU) or a semiconductor device that processes instructions stored in the memory 1300 and/or storage 1600. The memory 1300 and the storage 1600 may include various types of volatile or non-volatile storage media. For example, the memory 1300 may include an ROM and an RAM.

Therefore, the operations of the method or algorithm described in connection with the embodiments disclosed herein may be implemented directly in hardware and software modules executed by processor 1100, or a combination thereof. The software module may reside in a storage medium (i.e., memory 1300 and/or storage 1600) such as a RAM, a flash memory, a ROM, an EPROM, an EEPROM, a register, a hard disk, a solid state drive (SSD), a removable disk, and a compact disc read only memory (CD-ROM). An example storage medium may be coupled to processor 1100, and the processor 1100 may read information from and write information to the storage medium. Alternatively, the storage medium may be integrated with the processor 1100. The processor and the storage medium may reside within an application-specific integrated circuit (ASIC). The ASIC may reside within a user terminal. Alternatively, the processor and the storage medium may reside as separate components within the user terminal.

While the present invention has been described with reference to example embodiments thereof, the spirit of the present invention is not limited to the embodiments presented in this specification. Those skilled in the art who understand the spirit of the present invention may easily suggest other embodiments by adding, changing, or deleting elements within the scope of the same concept, and the other embodiments are also within the spirit of the present invention.

What is claimed is:

1. A third-party interference monitoring system to detect third-party interference in advance before a buried pipeline buried in the ground is damaged by the third-party interference, comprising:

a first sensor and a second sensor physically attached to an outer surface of the buried pipeline so as to detect impact signals which are propagated along the ground or the buried pipeline when heavy equipment strikes the ground, the first sensor and the second sensor being disposed to be spaced a predetermined interval from each other along a longitudinal direction of the buried pipeline; and a controller communicatively connected to the first sensor and the second sensor via at least one of a wired or wireless communication link, the controller being configured to:

receive data from each of the first sensor and the second sensor, acquire a first time domain value and a second time domain value, convert the first time domain value and the second time domain value into a first frequency domain value and a second frequency domain value, respectively, detect the third-party interference on the basis of frequency response characteristics of the impact signals, estimate a location of the third-party interference using the following equations:

$$D_1 = \frac{1}{2}(L + C\tau)$$

$$D_2 = \frac{1}{2}(L - C\tau)$$

(in the Equations, D1 denotes a distance between the location of the third-party interference and the first sensor, D2 denotes a distance between the location of the third-party interference and the second sensor, L denotes a total length of the buried pipeline, C denotes a propagation speed of the impact signal propagated through the buried pipeline, and t denotes a difference in arrival time between the impact signal on the first time domain value and the impact signal on the second time domain value), and in response to a plurality of impact signals being checked and a plurality of locations of the third-party interference that are estimated by analyzing each of the plurality of impact signals being all within a predetermined error range, determine that the third-party interference is a downward excavating third-party interference.

2. The third-party interference monitoring system of claim 1, further comprising a storage in which reference data for detecting the third-party interference is stored, wherein the controller is configured to analyze the frequency response characteristics in consideration of the reference data.

3. The third-party interference monitoring system of claim 2, wherein the reference data includes a frequency band of interest and a reference magnitude range, and the controller is configured to compare a magnitude range of a band corresponding to the frequency band of interest among the frequency domain values with the reference magnitude range and detect the third-party interference.

4. The third-party interference monitoring system of claim 3, wherein the frequency band of interest and the reference magnitude range are acquired by performing an experiment in advance on the buried pipeline or a pipeline having the same material and specification as the buried pipeline.

5. The third-party interference monitoring system of claim 1, wherein the controller is configured to determine whether the detected third-party interference is a dangerous third-party interference that is likely to damage the buried pipeline on the basis of the frequency response characteristics.

6. The third-party interference monitoring system of claim 1, wherein the controller is configured to determine whether the detected third-party interference is a downward excavating third-party interference in progress of downward excavation on the basis of the frequency response characteristics.

7. The third-party interference monitoring system of claim 6, wherein, in response to a plurality of impact signals being checked within a predetermined period of time and levels of frequency response characteristics of the plurality of impact signals being gradually increased, the controller is configured to determine that the third-party interference is a downward excavating third-party interference.

8. The third-party interference monitoring system of claim 1, wherein the controller is configured to analyze frequency response characteristics of an impact signal detected by the first sensor and frequency response characteristics of an impact signal detected by the second sensor, and in response to the presence of the third-party interference being confirmed in both of the cases, the controller is configured to determine that the third-party interference is detected.

9. The third-party interference monitoring system of claim 8, wherein the controller is configured to divide each of the first time domain value and the second time domain value into a plurality of time sections so that an overlapping portion is present between two adjacent time sections among the plurality of time sections, and convert each of the first time domain value and the second time domain value into a frequency domain value.

10. The third-party interference monitoring system of claim 1, wherein the controller is configured to detect the third-party interference on the basis of morphological characteristics of a waveform in the time domain in addition to the frequency response characteristics.

* * * * *